June 17, 1924.
J. HOFF
ANIMAL TRAP
Filed Sept. 12, 1921
1,498,376
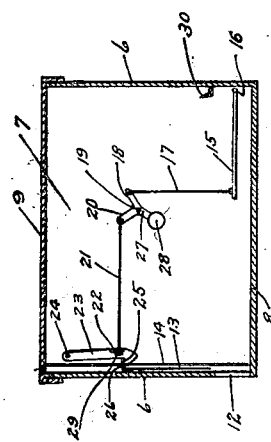
INVENTOR.
J. HOFF
BY Milton S. Crandall
ATTORNEYS.

Patented June 17, 1924.

1,498,376

UNITED STATES PATENT OFFICE.

JACOB HOFF, OF SPRINGFIELD, SOUTH DAKOTA.

ANIMAL TRAP.

Application filed September 12, 1921. Serial No. 499,878.

*To all whom it may concern:*

Be it known that I, JACOB HOFF, a citizen of the United States, and a resident of Springfield, in the county of Bon Homme and State of South Dakota, have invented certain new and useful Improvements in Animal Traps, of which the following is a specification.

My present invention aims to provide an improved and simplified animal trap adapted to entrap animals without killing or injuring them.

Another object of the invention is the production of an improved self-setting animal trap inexpensive in construction, yet simple and thoroughly dependable in operation.

The above and other objects and advantages I successfully attain in the embodiment hereinafter described, defined in the appended claim and illustrated in the accompanying drawings, which form a part of this application, and in which like characters of reference indicate corresponding parts, throughout the several views, of which—

Fig. 1 is a perspective view of a trap constructed in accordance with my invention, the cover being removed.

Fig. 2 is a plan of the same with the cover removed.

Fig. 3 is a longitudinal section thereof taken on the line 3—3 of Fig. 2.

Fig. 4 is a transverse section thereof taken on the line 4—4 of Fig. 2, and

Fig. 5 is an enlarged transverse section of the same taken on the line 5—5 of Fig. 2.

The invention is preferably embodied in a rectangular enclosure or box having side walls, 6, end walls, 7, a bottom, 8, and a removable cover, 9. Adjacent one end of the enclosure is a comparatively narrow passage, 10, provided by a transverse partition, 11, spaced a distance from one of the end walls, 7. One of the side walls, 6, is provided with an opening, 12, closed by a door including a sheet metal plate, 13, slidable vertically between suitable guide members, 14, on opposite sides of the opening, 12. At the end of the passage, 10, remote from the entrance-way, 12, is a plate, 15, slightly narrower than the passage, 10, and having its end adjacent the wall, 6, suitably pivoted, as at 16, to the partition, 11, and the adjacent end wall, 7, whereby the free end of the plate may oscillate vertically. The free end of the plate, 15, is connected by a link, 17, with one arm, 18, of a bell-crank fulcrumed, as at 19, to the end wall, 7, at a point above the plate, 15, and to the other arm, 20, of said bell crank is connected one end of a rod or wire, 21, the other end of which extends freely through a lateral projection, 22, on a trigger arm, 23, fulcrumed as at 24 above the door, 13, to the end wall, 7, the said arm, 23, being provided at its lower end with a shoulder, 25, engageable with a projecting part on the door, 13, as the flange, 26. The bell-crank is formed with a third arm, 27, having a counterweight, 28, so disposed as to hold the free end of the plate, 15, from the bottom, 8, of the passage. The wire, 21, is provided with a boss, 29, engageable with the projection, 22, whereby the arm, 23, is disengaged from the door, 13, permitting the door to drop and close the opening, 12, when the animal steps on the plate, 15, in approaching the bait hook, 30, positioned above the pivoted end of the plate, 15.

The entrance door being closed the animal then finds the only outlet from the passage, 10, is an opening, 31, in the partition, 11, which opening communicates with a longitudinal second passage, 32, provided by a partition, 33, spaced from the adjacent wall, 6, and extending between the farther wall, 7, and the partition, 11, the passage, 32, being covered by a horizontal partition, 34, spaced from the bottom, 8. Within the passage, 32, and adjacent its entrance opening, 31, is a light sheet metal closure, 35, pivoted at its lower end, 36, inclined from the entrance opening and approximately meeting the partition, 34. The plate, 35, is provided with a suitable counterweight, 37, which holds the said plate yieldably closed.

Upon entering the opening, 31, the animal encounters and depresses the plate, 35, and passes on into the passage, 32, whereupon the closure plate, 35, is elevated, preventing return of the animal. On the under side of the partition, 34, and adjacent the plate, 35, is a projecting guard, 38, which prevents the animal from engaging the free end of said plate. As the animal further traverses the passage, 32, it encounters another closure plate, 39, pivoted at its lower end, as at 40, inclined from its pivot and normally engaging at its free end the partition, 34. The free end portion of the said closure plate, 39, is connected by a suitable link, 41, with a lever, 42, fulcrumed as at 43 to the adjacent wall, 6, and above the passage, 32. From the opposite end of the lever, 42, depends a wire or rod, 44, which projects freely through the flange, 26, of the entrance door and is provided with a boss, 45, engageable with the flange, 26, to lift the door.

It will now be seen that as the animal, by its weight, depresses the plate, 39, thereby causing the lever, 42, to co-act with the wire, 44, to lift the door, 13, sufficiently high to permit the trip arm, 23, to engage the flange, 26, to hold the door open. Then, as the animal passes from the plate, 39, the latter is elevated by means of a counterweight, 46, on the lever, 42, and the wire, 44, is forced downwardly through the flange, 26, to permit a subsequent closing of the door, 13, through the medium of the plate, 15. The under side of the partition, 34, adjacent the free end of the plate, 39, is provided with a downwardly projecting guard, 47, which prevents the animal from depressing the said plate. The farther end of the passage, 32, is provided with an outlet opening, 48, in the partition, 33, which opening, 48, communicates with a passage including a wall, 49, spaced from the adjacent wall, 7, and a top wall, 50. Within the latter passage is a closure plate, 51, pivoted at its lower end, as at 52, and inclined from the passage, 32, and held in yieldable engagement with the top wall, 50, by a suitable counterweight, 53. Upon reaching the opening, 48, the animal depresses the closure plate, 51, and enters the larger compartment of the trap, 54.

Having thus described my invention, what I claim as new and desire to secure by Letters Patent of the United States, is:

An animal trap embodying a walled entrance compartment having a door movable vertically to open and close, a shouldered arm pivoted to releasably engage and normally support the door in open position, a plate within the compartment depressible by an animal, a bell-crank fulcrumed on a wall of the compartment and having one arm connected with the plate, a link between the other bell-crank arm and said shouldered arm, the bell-crank being counterweighted to hold the plate normally elevated, a second walled compartment communicating with the entrance compartment, a plate normally inclined to close the second compartment and depressible by the animal, a lever pivoted above said second compartment and having one end thereof connected to said second plate, a lateral projection on the door, a rod depending from the other arm of said lever, extending freely through said projection, and having a boss on its lower end engageable with said projection, whereby depression of said second plate causes the lever and rod to open the door, the lever being counterweighted to hold said second plate normally elevated.

In testimony whereof, I have hereunto set my hand this 8th day of September, 1921.

JACOB HOFF.